UNITED STATES PATENT OFFICE.

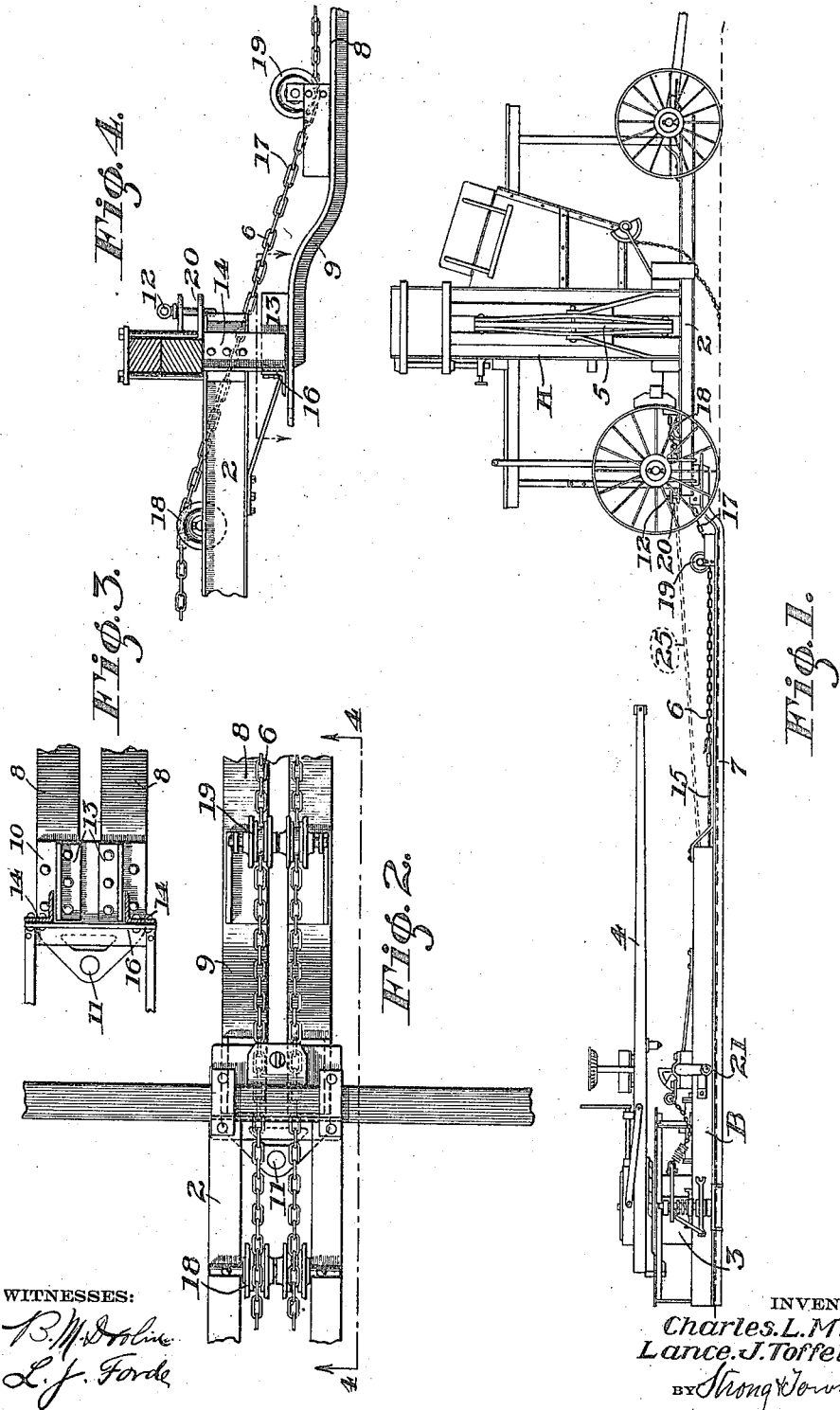

CHARLES L. MILLER AND LANCE J. TOFFELMIER, OF SAN LEANDRO, CALIFORNIA, ASSIGNORS TO JUNIOR MONARCH HAY PRESS COMPANY, OF SAN LEANDRO, CALIFORNIA, A CORPORATION OF CALIFORNIA.

BALING-PRESS.

1,239,932.

Specification of Letters Patent.

Patented Sept. 11, 1917.

Application filed May 24, 1916. Serial No. 99,552.

*To all whom it may concern:*

Be it known that we, CHARLES L. MILLER and LANCE J. TOFFELMIER, citizens of the United States, residing at San Leandro, in the county of Alameda and State of California, having invented new and useful Improvement in Baling-Presses, of which the following is a specification.

This invention relates to a portable baling press, and particularly to means for transmitting power thereto.

In the operation of certain baling presses throughout the country, it is common practice to generate the power required for the operation of the press by using a team of horses. These are generally attached to the end of a sweep driving a bull-wheel, and the power thus generated is transmitted to the plunger of the press by means of a chain, one end of which is attached to the bull-wheel, while the opposite end is connected with the plunger operating mechanism of the press.

It is also a practice when moving the baling outfit from place to place to load the baling press crosswise on an ordinary wagon or running gear, and when the new destination is reached to unload the baler and place it directly upon the ground to permit the chain through which the power is transmitted to lie as close to the ground as possible; this being necessary, as otherwise it might trip up the horses or injure their feet, while pulling the sweep around and around.

The object of the present invention is to provide a portable baler and bull-wheel and particularly to provide an intermediate frame between the two, which will first serve as a guide for the power transmitting chain to prevent the horses from tripping, etc.; and second, it can serve as a connection between the baler and bull-wheel to permit one to trail behind the other, when moving from place to place, and furthermore, to obviate all necessity of lowering the baler, removing the wheels or unloading same. Further objects will hereinafter appear.

The invention consists of the parts and the construction and combination of parts, as hereinafter more fully described and claimed, having reference to the accompanying drawings, in which—

Figure 1 is a side elevation of a baling outfit, showing the application of the invention.

Fig. 2 is a plan view of the rear end of the truck upon which the baling press is mounted, showing the connection between the chain guide frame and the truck.

Fig. 3 is a similar view of the free end of the chain guide frame.

Fig. 4 is a section on line 4—4, Fig. 2.

Referring to the drawings in detail, A indicates a suitable form of baling press, which in this instance is permanently secured upon a truck 2. B indicates in general the supporting frame of a horse-driven power unit; 3 the bull-wheel and 4 the sweep to which the horses are attached and upon which power is transmitted to drive the bull-wheel and connecting mechanism.

Connecting the bull-wheel with the end of the operating levers 5 of the baling press is a chain 6. This chain is provided for the purpose of transmitting power from the bull-wheel to the levers for the purpose of raising and lowering the plunger within the press and for other purposes, not necessarily here described.

The main feature of the present invention is the provision of a guide frame generally indicated at 7 for the purpose of guiding the transmitting chain and to hold this as close to the ground surface as possible to prevent interference with the team, and for other purposes. The frame 7 is in this instance formed as an extension on the bull-wheel frame B, and consists of a pair of angle iron rails 8, which are suitably secured at one end to the frame B of the bull-wheel. The outer ends of the rails 8 are bent or offset, as at 9 and are here connected by means of a plate 10, the outer end of which is perforated, as at 11 to receive a pin bolt 12, hereinafter to be described. Secured on the plate 10 is a pair of short angle iron sections 13, which constitute a yoke and are adapted to engage with a pair of downwardly extending angle bars 14, secured on the end of the truck frame 2. The angle bar sections 14 are spaced apart sufficiently far to permit the angle sections 13 to enter between same and will in this manner secure the extension frame 7 from side movement with relation to the truck frame 2. The bar sections 13 also lock the two frame members against endwise movement with relation to each other, as they simultaneously abut with a cross-plate 16, secured on the end of the truck frame 2. Secured upon the rails 8 of the extension frame 7 is a pair of guide wheels 19 and similarly secured and journaled between the bars of the truck frame 2 is a pair of guide wheels 18. The chain extending lengthwise with relation to the frame, first passes under the guide wheel 19 and then over the wheel 18. The wheels in this instance are, however, arranged in pairs, as shown in Fig. 2, as two chains are employed, one being connected with each lever 5 of the press. The opposite ends of the chains are then hooked to a cable or bar 15, which is tightened by means of the bull-wheel 3. The whole connection, such as the chains 6 and the cables 15 forming the connection between the press and the bull-wheel will, however, be termed a transmission chain, and instances are encountered where one, two or more may be employed. The provision of the guide wheels 19 and 18 permit the main section of the transmission chain to be held close to the ground surface by the guide frame 7, and in actual practice will not extend over three inches above ground. Any interference with the team is thus obviated and the chain is at the same time permitted to be raised at the offset end of the frame 7 at the point indicated at 17 between the wheels 19 and 18 to bring same in alinement with the lower ends of the press operating levers 5. The necessity of unloading the baler is thus obviated and it may, therefore, be permanently secured and mounted upon the truck 2. The guide frame 7 which in this instance forms an extension of the frame B helps to form an anchor for said frame, which secures it against swinging movement when the team is working. It furthermore, forms a connection between the bull-wheel and the baling press supporting truck 2 to permit the bull-wheel to trail behind when moving from place to place. This is accomplished by lifting the extension frame 7 up to the coupling shown at 20 and inserting the pin bolt 12 through the perforation 11 formed in plate 10. Any means may be provided for the purpose of raising and lowering the frame B, carrying the bull-wheel and sweep off the ground when moving from place to place, but preferably the crank axle shown at 21. A pair of wheels placed upon this axle serve to support the frame and as the extension frame 7 forms a coupling between frame B and the truck 2, it can easily be seen that a perfect trailing unit is provided which may be raised or lowered with relation to the ground, as occasion may demand by turning the crank axle 21.

The provision of the guide or extension frame 7, where portable balers are concerned is a positive necessity. This frame together with the guide wheels 19 and 18 employed holds the chain down against the ground and also directly into alinement with the lower ends of the plunger operating arm 5 of the baling press. The necessity of this connection can readily be appreciated, as its elimination would cause the chain to assume the dotted line position, shown at 25 in Fig. 1, which position is sufficiently high to seriously interfere with the team and in the work accomplished.

The materials and finish of the several parts of the device may otherwise be such as the judgment and experience of the manufacturer may dictate.

Having thus described our invention, what we claim and desire to secure by Letters Patent is—

1. The combination with a baling press, a bull-wheel, a frame supporting the wheel, and a chain by which power is transmitted from the bull-wheel to the press, of a guide frame for the chain extending from the first frame and consisting of parallel connected angle iron bars having their vertical flanges depending to engage in the ground when said guide frame is operatively disposed, said bars being upwardly offset at their free ends for connection with the baling press.

2. The combination with a portable baling press, a wheeled support therefor, a trailing frame, a bull-wheel on the frame, of an extension guide frame on the trailing frame, means coupling the guide frame to the wheeled support for moving the trailing frame with the wheeled support, a power transmitting chain connecting the bull-wheel to the press, said guide frame being adapted to be uncoupled from the wheeled support and positioned to serve as a guide for the chain, and means on the wheeled support for interlocking with the guide frame when the latter is uncoupled from the support for holding the guide frame operatively disposed.

3. The combination with a press, a support therefor embodying spaced frame members, a bull-wheel, a frame supporting the wheel and means on the support to couple the frame extension therewith for transportation purposes, of a depending upright on each frame member, a connecting cross bar for the spaced uprights, a pulley on the support, a second pulley on the frame extension, a power-transmitting chain connecting the press to the bull-wheel and passing about the pulleys and between the frame members, and means on the frame extension for interlocking with the uprights when said frame is uncoupled from the support.

4. The combination with a baling press, a support therefor, a bull-wheel, and a frame for the wheel, of a yoke depending from the press support, a guide frame leading forwardly from the first frame and adapted to serve as a coupling between the latter and the press support, and a power transmitting chain connecting the press and bull-wheel, said guide frame being adapted to be uncoupled from the support and positioned for guiding the chain in its movement and interlocking at its forward end with said yoke.

5. The combination with a baling press, a support therefor, a bull-wheel, and a frame for the wheel, of a yoke depending from the press support, a guide frame leading forwardly from the first frame and adapted to serve as a coupling between the latter and the press support, a power transmitting chain connecting the bull-wheel with the press and being adapted for guidance by said guide frame when the latter is uncoupled from the press support, and interlocked with the yoke, said guide frame having its forward end upwardly offset for interlockingly engaging with the yoke.

In testimony whereof we have hereunto set our hands in the presence of two subscribing witnesses.

CHARLES L. MILLER.
LANCE J. TOFFELMIER.

Witnesses:
J. C. TOFFELMIER,
ELLIE HOOLEY.

Copies of this patent may be obtained for five cents each, by addressing the "Commissioner of Patents, Washington, D. C."